United States Patent
Guajardo et al.

(10) Patent No.: US 12,549,964 B2
(45) Date of Patent: Feb. 10, 2026

(54) UTILIZATION OF PROBES TO DETECT ANOMALIES AND DYNAMICALLY ADJUST NETWORK PARAMETERS

(71) Applicant: DISH Wireless L.L.C., Englewood, CO (US)

(72) Inventors: Marcel Guajardo, Lakewood, CO (US); Stacey Osborn, Arvada, CO (US); Adam H. Saenger, Castle Pines, CO (US); James Gregory Johnston, Castle Rock, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 508 days.

(21) Appl. No.: 18/092,046

(22) Filed: Dec. 30, 2022

(65) Prior Publication Data
US 2024/0224074 A1    Jul. 4, 2024

(51) Int. Cl.
*H04W 24/02* (2009.01)
*H04L 43/12* (2022.01)
*H04W 24/08* (2009.01)

(52) U.S. Cl.
CPC ............. *H04W 24/02* (2013.01); *H04L 43/12* (2013.01); *H04W 24/08* (2013.01)

(58) Field of Classification Search
CPC ........ H04W 24/02; H04W 24/08; H04L 43/12
See application file for complete search history.

(56) References Cited

U.S. PATENT DOCUMENTS

| | | |
|---|---|---|
| 9,164,159 B2 | 10/2015 | Nath et al. |
| 9,781,685 B2 | 10/2017 | Tsui et al. |
| 10,178,646 B2 | 1/2019 | Bosch et al. |
| 10,230,571 B2 | 3/2019 | Rangasamy et al. |

(Continued)

FOREIGN PATENT DOCUMENTS

EP    3 869 847 A1    8/2021

OTHER PUBLICATIONS

"5G Network Evolution with AWS," Amazon Web Services, Inc., https://d1.awsstatic.com/whitepapers/5g-network-evolution-with-aws.pdf, Jul. 2020, 48 pages.

(Continued)

*Primary Examiner* — Schquita D Goodwin
(74) *Attorney, Agent, or Firm* — Seed Intellectual Property Law Group LLP

(57) ABSTRACT

Methods and apparatuses for improving network performance including tracking wireless signal data associated with one or more wireless networks and dynamically adjusting network parameters of the one or more wireless networks to meet service level agreement requirements based on the wireless signal data are described. Smart probes may be positioned within an environment and configured to acquire the wireless signal data and transmit the wireless signal data to a wireless network controller. The wireless network controller may acquire the wireless signal data from the smart probes, acquire network performance data from one or more computing devices using the one or more wireless networks, detect a deviation in network performance based on the wireless signal data and the network performance data, and cause one or more network parameters of the one or more wireless networks to be adjusted in response to detection of the deviation in network performance.

20 Claims, 12 Drawing Sheets

(56) References Cited

U.S. PATENT DOCUMENTS

| | | | |
|---|---|---|---|
| 10,278,123 B2 | 4/2019 | Wang et al. | |
| 10,452,372 B2 | 10/2019 | Lundberg et al. | |
| 10,484,892 B2 | 11/2019 | Bellamkonda et al. | |
| 10,499,276 B2 | 12/2019 | Chan et al. | |
| 10,499,376 B2 | 12/2019 | Kim | |
| 10,656,929 B2 | 5/2020 | Jamjoom et al. | |
| 10,716,096 B2 | 7/2020 | Yu et al. | |
| 10,812,377 B2 | 10/2020 | Stammers et al. | |
| 10,886,976 B2 | 1/2021 | Rajagopal et al. | |
| 10,904,038 B1 | 1/2021 | Haque | |
| 10,944,668 B2 | 3/2021 | Rajagopal et al. | |
| 10,986,540 B2 | 4/2021 | Bor Yaliniz et al. | |
| 11,019,159 B2 | 5/2021 | Lawson et al. | |
| 11,128,985 B2 | 9/2021 | Edge et al. | |
| 11,153,271 B2 | 10/2021 | Yang et al. | |
| 11,223,994 B2 | 1/2022 | Yang et al. | |
| 11,228,621 B2 | 1/2022 | Sharma et al. | |
| 11,240,063 B2 | 2/2022 | Liu et al. | |
| 11,284,297 B2 | 3/2022 | Barton et al. | |
| 2002/0170053 A1 | 11/2002 | Peterka et al. | |
| 2015/0109976 A1 | 4/2015 | Zhang et al. | |
| 2016/0338059 A1* | 11/2016 | Huang | H04W 72/0453 |
| 2017/0079059 A1 | 3/2017 | Li et al. | |
| 2018/0049015 A1 | 2/2018 | Gupta et al. | |
| 2018/0307514 A1 | 10/2018 | Koutyrine et al. | |
| 2019/0082382 A1* | 3/2019 | Homchaudhuri | H04W 52/0225 |
| 2019/0220703 A1 | 7/2019 | Prakash et al. | |
| 2019/0253907 A1 | 8/2019 | Yao et al. | |
| 2019/0289497 A1 | 9/2019 | Rajagopal | |
| 2019/0306923 A1 | 10/2019 | Xiong et al. | |
| 2019/0349429 A1 | 11/2019 | Jain et al. | |
| 2020/0050494 A1 | 2/2020 | Bartfai-Walcott et al. | |
| 2020/0106536 A1 | 4/2020 | Bedekar | |
| 2020/0125389 A1 | 4/2020 | Palermo et al. | |
| 2020/0195495 A1 | 6/2020 | Parker et al. | |
| 2020/0296023 A1* | 9/2020 | Kumar | H04L 43/103 |
| 2021/0014912 A1 | 1/2021 | Song et al. | |
| 2021/0084509 A1* | 3/2021 | Li | H04W 52/241 |
| 2021/0092013 A1* | 3/2021 | Zhou | G01S 13/765 |
| 2021/0119881 A1* | 4/2021 | Shirazipour | H04L 41/0894 |
| 2021/0144517 A1 | 5/2021 | Guim Bernat et al. | |
| 2021/0144613 A1 | 5/2021 | Colom Ikuno et al. | |
| 2021/0194821 A1 | 6/2021 | Guim Bernat et al. | |
| 2021/0204162 A1 | 7/2021 | Chunduri et al. | |
| 2021/0242893 A1 | 8/2021 | Goodman et al. | |
| 2021/0258231 A1 | 8/2021 | Venkataramu et al. | |
| 2021/0258836 A1 | 8/2021 | Faccin et al. | |
| 2021/0306874 A1 | 9/2021 | Bedekar | |
| 2021/0314842 A1 | 10/2021 | Padlikar et al. | |
| 2021/0377116 A1 | 12/2021 | Yeh et al. | |
| 2022/0035650 A1 | 2/2022 | Banerjee et al. | |
| 2022/0052959 A1* | 2/2022 | Rosen | H04L 43/087 |
| 2022/0070734 A1 | 3/2022 | Rajagopal | |
| 2022/0417734 A1* | 12/2022 | Ramanathan | H04W 4/023 |
| 2023/0090727 A1* | 3/2023 | Yun | H04W 24/04 370/241.1 |
| 2023/0273291 A1* | 8/2023 | Ozturk | G01S 7/006 342/52 |
| 2024/0040488 A1* | 2/2024 | Saloni | H04W 48/16 |

OTHER PUBLICATIONS

"Deploying E2E 5G Network with AWS," Amazon Web Services, Inc., https://d1.awsstatic.com/architecture-diagrams/ArchitectureDiagrams/5g-with-aws-ra.pdf?did=wp_card&trk=wp_card, 2020, 1 page.

"Promoting the Deployment of 5G Open Radio Access Networks," 5G Americas, Nov. 2020, 60 pages.

"Continuous Integration and Continuous Delivery for 5G Networks on AWS," Amazon Web Services, Inc., https://docs.aws.amazon.com/whitepapers/latest/cicd_for_5g_networks_on_aws/cicd_for_5g_networks_on_aws.html, Mar. 8, 2021, 31 pages.

"Cloud Automation for 5G Network," Amazon Web Services, Inc., https://d1.awsstatic.com/whitepapers/cloud-automation-for-5g-network.pdf, Jun. 16, 2021, 22 pages.

Bye et al., "Reinventing cloud-native 5G networks," Amazon Web Services, Inc., https://www.fcc.gov/file/21588/download, 2021, 11 pages.

"Next-Generation Mobile Private Networks Powered by AWS," Amazon Web Services, Inc., https://docs.aws.amazon.com/whitepapers/latest/mobile-private-networks/mobile-private-network-components.html, Jan. 27, 2021, 29 pages.

"Dish lays the foundation for 5G network security," Dish Wireless, https://mma.prnewswire.com/media/1483423/Security_Whitepaper_CLEAN.pdf?p=original, Apr. 8, 2021, 12 pages.

"Future of the Connected Vehicle," Dish Wireless, https://www.dishwireless.com/content/dam/pdfs/wi-whitepaper-connectedcar.pdf, Jan. 6, 2022, 22 pages.

Maule et al., "Real-time Dynamic Network Slicing for the 5G Radio Access Network," Iquadrat Informatica S.L., https://ieeexplore.ieee.org/document/9013965, Dec. 9-13, 2019, 6 pages.

"Amazon EC2 Overview and Networking Introduction for Telecom Companies," Amazon Web Services, Inc., https://d1.awsstatic.com/whitepapers/amazon-ec2-networking-for-telecom.pdf, Sep. 2019, 27 pages.

* cited by examiner

UTILIZATION OF PROBES TO DETECT ANOMALIES AND DYNAMICALLY ADJUST NETWORK PARAMETERS

BACKGROUND

Next generation wireless networks have the promise to provide higher throughput, lower latency, and higher availability compared with previous wireless communication standards. For fifth generation (5G) wireless networks, a combination of control and user plane separation (CUPS) and multi-access edge computing (MEC), which allows compute and storage resources to be moved from a centralized cloud location to the "edge" of a network and closer to end user devices and equipment, has enabled low-latency applications with millisecond response times. 5G wireless user equipment (UE) may communicate over both a lower frequency sub-6 GHz band between 410 MHz and 7125 MHz and a higher frequency mmWave band between 24.25 GHz and 52.6 GHz. In general, although lower frequencies may provide a lower maximum bandwidth and lower data rates than higher frequencies, lower frequencies may provide higher spectral efficiency and greater range. Thus, there is a tradeoff between coverage and speed. For example, although the mmWave spectrum may provide higher data rates, the millimeter waves may not penetrate through objects, such as walls, and may have a more limited range.

BRIEF SUMMARY

Systems and methods for improving network performance and availability including tracking wireless signal data associated with one or more wireless networks using configurable probes and adjusting network parameters of the one or more wireless networks to meet service level agreement requirements based on the wireless signal data are provided. In some embodiments, an adaptable wireless networking system may acquire the wireless signal data from the configurable probes, acquire network performance data from one or more computing devices using the one or more wireless networks, detect a deviation in network performance and/or wireless signal characteristics based on the wireless signal data and the network performance data, and cause one or more network parameters of the one or more wireless networks to be adjusted in response to detection of the deviation in network performance and/or wireless signal characteristics.

According to some embodiments, the technical benefits of the systems and methods disclosed herein include improved performance with wireless network connections, improved availability of wireless network connections, improved system performance, and reduced system power and energy consumption.

BRIEF DESCRIPTION OF THE DRAWINGS

Like-numbered elements may refer to common components in the different figures.

DETAILED DESCRIPTION

Figure 1A:
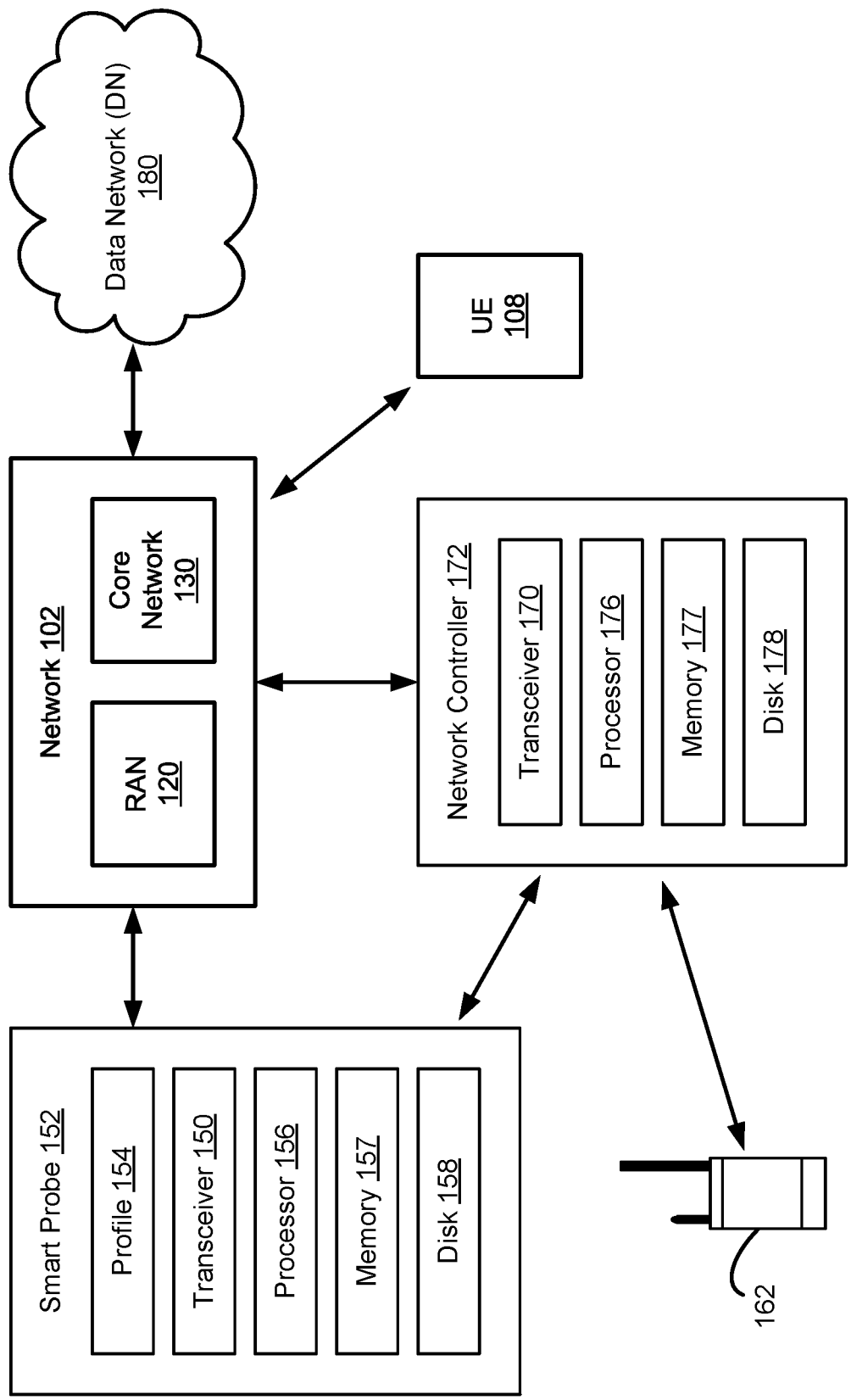
FIG. 1A depicts one embodiment of programmable smart probes in communication with a wireless network controller.

Technology is described for improving network performance by tracking wireless signal data associated with one or more wireless networks over time and dynamically adjusting network parameters of the one or more wireless networks to meet service level agreement (SLA) requirements based on the wireless signal data. One or more smart probes positioned within a selected or defined environment (e.g., an office building) may be configured to acquire the wireless signal data. A smart probe may comprise a radio frequency (RF) probe that is configured to capture RF signals within a programmable RF range. A smart probe may comprise a software-defined radio that may be programmed to mimic a smartphone or wireless device that utilizes a particular broadcast standard (e.g., the 5G wireless standard) for wireless communication. A wireless network controller in communication with the one or more smart probes may acquire the wireless signal data associated with the one or more wireless networks from the one or more smart probes, acquire network performance data from one or more computing devices within the environment using the one or more wireless networks, detect a deviation in network performance based on the wireless signal data and the network performance data, and cause one or more network parameters of the one or more wireless networks to be adjusted in response to detection of the deviation in network performance.

The detection of the deviation in network performance may include detection that a network bandwidth for a wireless network of the one or more wireless networks has fallen below a threshold bandwidth (e.g., is less than 5 gigabits per second). The wireless signal data may include signal strength and noise metrics at different locations within the environment. As examples, the wireless signal data may include a power level of a received signal in decibels per milliwatt (dBm) at a particular location within the environment and a signal-to-noise ratio (SNR) in decibels (dB) associated with a power ratio between a signal strength and a noise level at the particular location. The network performance data may include network uptime, network bandwidth, and network latency. The one or more network parameters may include one or more antenna parameters for an antenna transmitting wireless signals for the one or more wireless networks. The one or more antenna parameters may include azimuth adjustment, elevation change, antenna tilt, antenna beam tilt, and transmit power. The antenna may comprise a multiple-input multiple-output (MIMO) antenna with the ability to perform digital beamforming and tilting. These examples of wireless signal data, network performance data, and network parameters are for illustrative purposes and other types of wireless signal data, network performance data, or network parameters may be utilized.

One technical issue with high frequency small cell transmissions (e.g., 5G small cell transmissions) is that the broadcast transmissions may have a limited broadcasting range and may be more vulnerable to signal interference and signal blockages (e.g., due to humans and vehicles moving within an environment). The signal interference and blockages may vary over time as wireless transmitters (e.g., mobile phones) move within an environment, such as a work environment. In some cases, to compensate for changes in signal interference and blockages, smart probes may be placed within the environment (e.g., comprising a private network installation for an enterprise) to guarantee SLA performance by continuously performing a wide-spectrum analysis (e.g., from 54 MHz to 6 GHz) of wireless signal transmissions for one or more wireless networks, detecting wireless signal strength and network performance anomalies affecting the one or more wireless networks, and adjusting small cells transmitting the wireless signal transmissions to improve wireless networking performance for the one or more wireless networks (e.g., increasing or decreasing power output and beam tilt for the small cells). The small cells may provide wireless connectivity for multiple wireless devices within the environment. The small cells may comprise picocells or femtocells. In one example, the smart probes may be installed throughout the inside of a building to acquire wireless signal measurements for wireless signals transmitted using the small cells. The smart probes may comprise plug-n-play probes (e.g., USB powered probes) or be mounted throughout the building.

A smart probe may comprise a programmable probe. In some embodiments, one or more programmable probes (or smart probes) may be positioned or installed within an environment and a wireless network controller in communication with the one or more programmable probes may perform RF planning and optimization of a wireless network operating within the environment. Each programmable probe may include a software-defined radio receiver that may be programmed to mimic numerous wireless devices (e.g., to mimic 50 different cell phones or mobile devices) with respect to their ability to transmit and receive wireless signals. Each programmable probe may perform a wide-spectrum analysis for a programmable RF range (e.g., from 54 MHz to 6 GHz). A program or profile may be loaded into a programmable probe to configure the probe to capture and/or analyze a particular frequency range (e.g., between 54 MHz and 6 GHz or between 3.5 GHz and 3.7 GHz). Each programmable probe may include a programmable RF front end that allows program instructions and/or configuration settings from the program or profile to support various wireless standards and spectrum profiles.

In some cases, the one or more programmable probes may transmit real-time wireless signal measurement data during preinstallation or during the early stages of an installation when RF tuning is required. The programmable probes may also remain permanently installed to transmit real-time wireless signal measurement data over the entire duration of a network installation in order to provide lifetime service-level assurance. The wireless signal measurement data may include a determination of the signal power levels of RF signals with respect to frequency. A wireless network controller may continuously acquire the wireless signal measurement data for a wireless network from the programmable probes, detect signal strength anomalies based on the wireless signal measurement data, and dynamically adjust small cells (e.g., adjusting which channels are being used by the small cells, as well as the power output and beam tilt used by the small cells) to meet SLA requirements for the wireless network. In a multi-tenant environment, the adjustments in the small cells may be across different network installations for different customers. The adjustments in the small cells may include adjusting an antenna tilt, antenna beam tilt, and/or transmit power for the small cells.

In some cases, the wireless network controller may generate and output real-time heat maps to facilitate RF tuning and remote debugging of network issues. The wireless network controller may also generate and store periodic baseline wireless signal measurements in order detect anomalous wireless signal patterns and then output an alert if a rogue or unknown signal has been detected within the environment.

The technical benefits of tracking wireless signal data associated with one or more wireless networks over time using one or more smart probes and dynamically adjusting network parameters of the one or more wireless networks to meet SLA requirements include increased performance and availability of wireless networks, and reduced network maintenance costs as wireless network diagnostics and adjustments may be automatically performed remotely and in real-time.

FIG. 1A depicts one embodiment of programmable smart probes 152 and 162 in communication with a wireless network controller 172. The network controller 172 may communicate with a wireless network 102 that provides wireless connectivity to user equipment (UE) 108 that is communicating with a data network (DN) 180 via the wireless network 102. The wireless network 102 may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). In one example, the wireless network 102 may comprise a 5G wireless network or a 6G wireless network. An example of the wireless network 102 is described in more detail below in conjunction with FIG. 1B. The data network 180 may comprise a portion of the Internet, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. The UE 108 may comprise a mobile computing device (e.g., a smartphone) or a non-mobile computing device (e.g., a desktop computer). The wireless network 102 includes a radio access network 120 and a core network 130.

As depicted in FIG. 1A, the smart probe 152 includes a profile 154, a transceiver 150, a processor 156, a memory 157, and a disk 158 all in communication with each other. Processor 156 allows the smart probe 152 to execute computer readable instructions stored in memory 157 in order to perform processes discussed herein. Processor 156 may include one or more processing units, such as one or more CPUs and/or one or more GPUs. Memory 157 may comprise one or more types of memory (e.g., RAM, SRAM, DRAM, ROM, EEPROM, or Flash). Memory 157 may comprise a hardware storage device or a semiconductor memory. The transceiver 150 may comprise wireless transmitter/receiver circuitry for transmitting and receiving wireless signals. The profile 154 may include instructions and/or configuration settings for configuring the smart probe 152 to capture and/or analyze wireless signals within a particular frequency range (e.g., between 54 MHz and 6 GHz or between 3 GHz and 4 GHz). The programmable smart probe 152 may also be in communication with the wireless network 102.

The smart probe 162 may be an embodiment of the smart probe 152. Accordingly, the smart probe 162 may include a profile, a transceiver, a processor, a memory, and a disk (not illustrated for ease of discussion) similar to the profile 154, transceiver 150, processor 156, memory 157, and disk 158 of the smart probe 152. Unlike smart probe 152, the smart probe 162 may not be in communication with the wireless network 102 in some embodiments.

The network controller 172 may comprise a wireless network controller that includes a transceiver 170, a processor 176, a memory 177, and a disk 178 all in communication with each other. Examples of the network controller 172 are discussed in more detail below in conjunction with FIGS. 2A and 2B. Processor 176 allows the network controller 172 to execute computer readable instructions stored in memory 177 in order to perform processes discussed herein. Processor 176 may include one or more processing units, such as one or more CPUs and/or one or more GPUs. Memory 177 may comprise one or more types of memory (e.g., RAM, SRAM, DRAM, ROM, EEPROM, or Flash). Memory 177 may comprise a hardware storage device or a semiconductor memory. The transceiver 170 may comprise wireless transmitter/receiver circuitry for transmitting and receiving wireless signals, such as for communicating with smart probes 152 and 162 and wireless network 102.

Figure 1B:
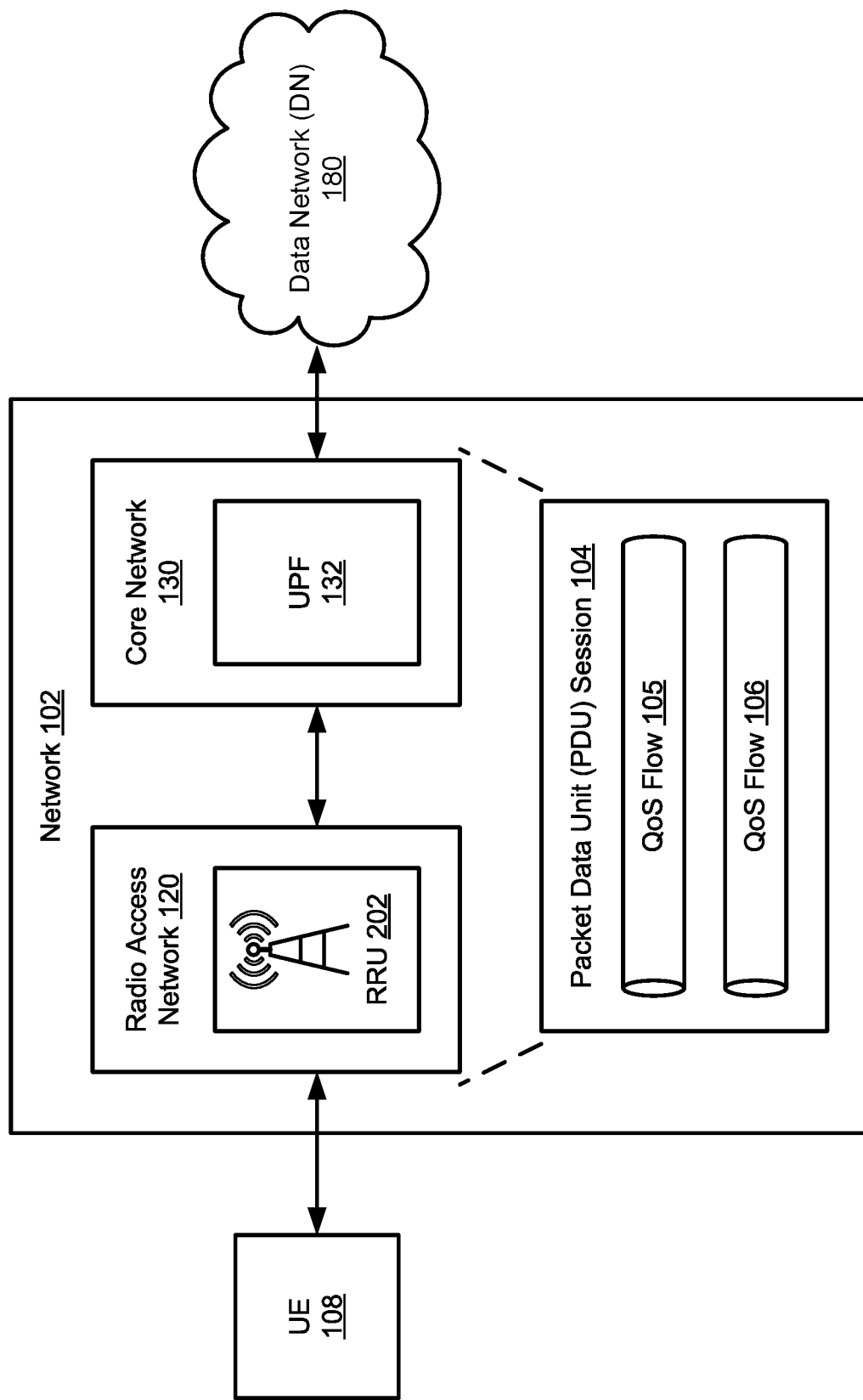
FIG. 1B depicts an embodiment of a network including a radio access network (RAN) and a core network.

FIG. 1B depicts an embodiment of a network 102 including a radio access network (RAN) 120 and a core network 130. The network 102 may comprise a 5G wireless network. The radio access network 120 may comprise a new-generation radio access network (NG-RAN) that uses the 5G new radio interface (NR). The network 102 connects user equipment (UE) 108 to the data network (DN) 180 using the radio access network 120 and the core network 130. Additional details and examples the radio access network 120 and the core network 130 providing a communications channel between the user equipment 108 and the data network 180 is described in more detail below in conjunction with FIGS. 1C and 1D. The data network 180 may comprise the Internet, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. In at least one example, the UE 108 may comprise a 5G smartphone or a 5G cellular device that connects to the radio access network 120 via a wireless connection. The UE 108 may comprise one of a number of UEs not depicted that are in communication with the radio access network 120. The UEs may include mobile and non-mobile computing devices. The UEs may include laptop computers, desktop computers, an Internet-of-Things (IoT) devices, and/or any other electronic computing device that includes a wireless communications interface to access the radio access network 120.

The radio access network 120 includes a remote radio unit (RRU) 202 for wirelessly communicating with UE 108. The remote radio unit (RRU) 202 may comprise a radio unit (RU) and may include one or more radio transceivers for wirelessly communicating with UE 108. The remote radio unit (RRU) 202 may include circuitry for converting signals sent to and from an antenna of a base station into digital signals for transmission over packet networks. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions may comprise the access and mobility management function (AMF), the session management function (SMF), and the user plane function (UPF). The UPF (e.g., UPF 132) may perform packet processing including routing and forwarding, quality of service (QOS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the radio access network 120, such as a distributed unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the distributed unit (DU) and the centralized unit (CU) of the radio access network 120 may be co-located with the remote radio unit (RRU) 202. In other embodiments, the distributed unit (DU) and the remote radio unit (RRU) 202 may be co-located at a cell site and the centralized unit (CU) may be located within a local data center (LDC).

The network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the network 102. In some cases, the network 102 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance.

In some cases, the network 102 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

A cloud-based compute and storage infrastructure may comprise a networked computing environment that provides a cloud computing environment. Cloud computing may refer to Internet-based computing, wherein shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1B, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The network 102 may connect the UE 108 to the data network 180 using a packet data unit (PDU) session 104, which may comprise part of an overlay network.

The PDU session 104 may utilize one or more quality of service (QOS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The radio access network 120 may be configured to establish and release parts of the PDU session 104 that cross the radio interface.

The radio access network 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 1B, the UPF 132 may be responsible for routing and forwarding user plane packets between the radio access network 120 and the data network 180. Uplink packets arriving from the radio access network 120 may use a general packet radio service (GPRS) tunneling protocol (or GTP tunnel) to reach the UPF 132. The GPRS tunneling protocol for the user plane may support multiplexing of traffic from different PDU sessions by tunneling user data over the interface between the radio access network 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before forwarded towards the appropriate radio access network 120. A QoS flow may correspond with a stream of data packets that have equal quality of service (QOS). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1C, during setup of the PDU session 104. The SMF may generate the set of SDF templates using information provided from a policy control function (PCF). The UPF 132 may track various statistics regarding the volume of data transferred by each PDU session, such as PDU session 104, and provide the information to an SMF.

Figure 1C:
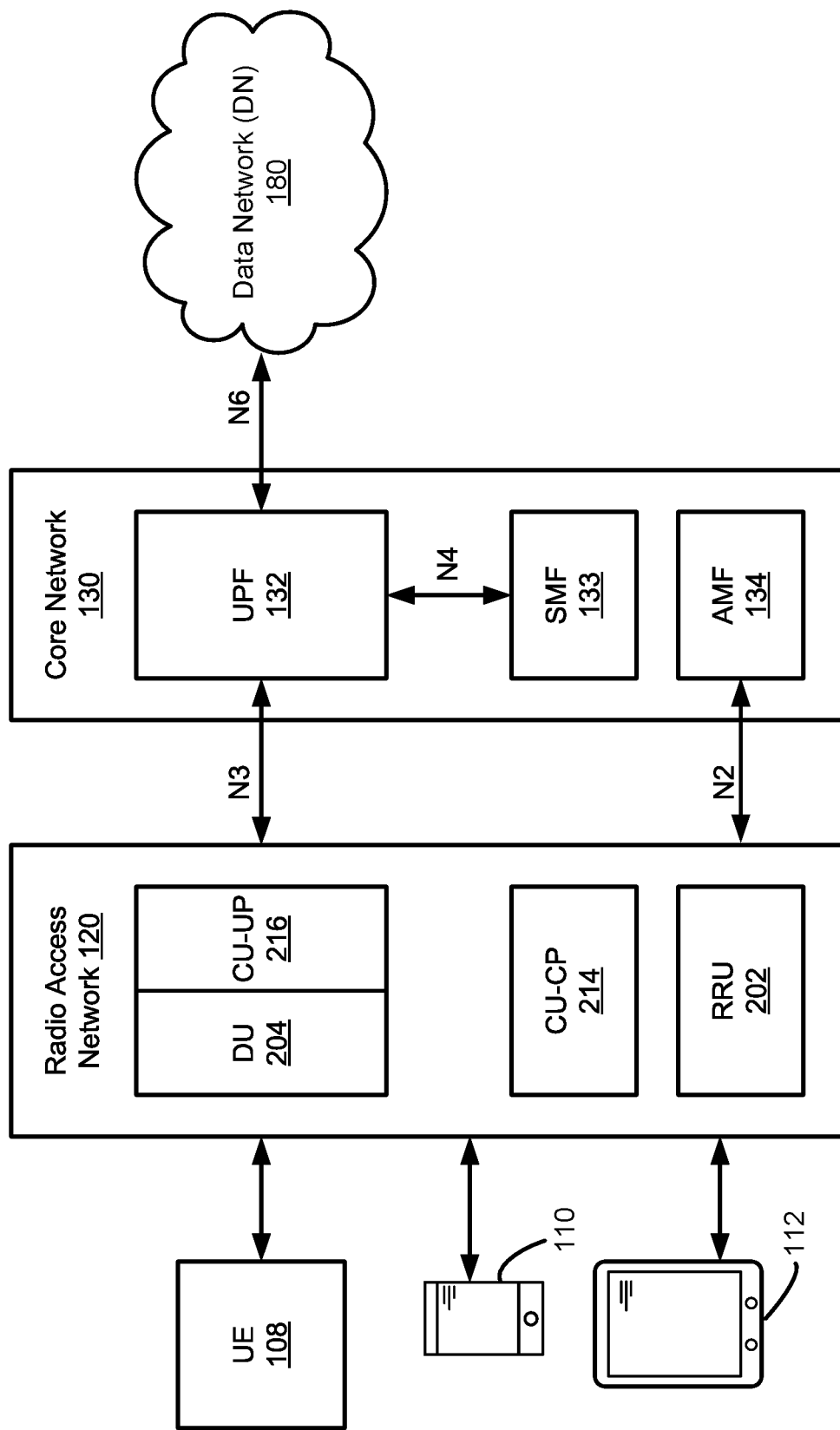
FIGS. 1C-1D depict embodiments of a radio access network and a core network for providing a communications channel between user equipment and data network.

FIG. 1C depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112. The user equipment may include a plurality of electronic devices, including mobile computing device and non-mobile computing device.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into a remote radio unit (RRU) 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The radio access network 120 may be connected to the AMF 134, which may allocate temporary unique identifiers, determine tracking areas, and select appropriate policy control functions (PCFs) for user equipment, via an N2 interface. The N3 interface may be used for transferring user data (e.g., user plane traffic) from the radio access network 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The radio access network 120 may be connected to the SMF 133, which may manage UE context and network handovers between base stations, via the N2 interface. The N2 interface may be used for transferring control plane signaling between the radio access network 120 and the AMF 134.

The RRU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular base stations) and 180 different RRUs.

In some embodiments, the radio access network 120 or portions of the radio access network 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 204 and CU-UP 216 may be executed as virtual instances within a data center environment that provides single-digit millisecond latencies (e.g., less than 2 ms) from the virtual instances to the UE 108.

Figure 1D:
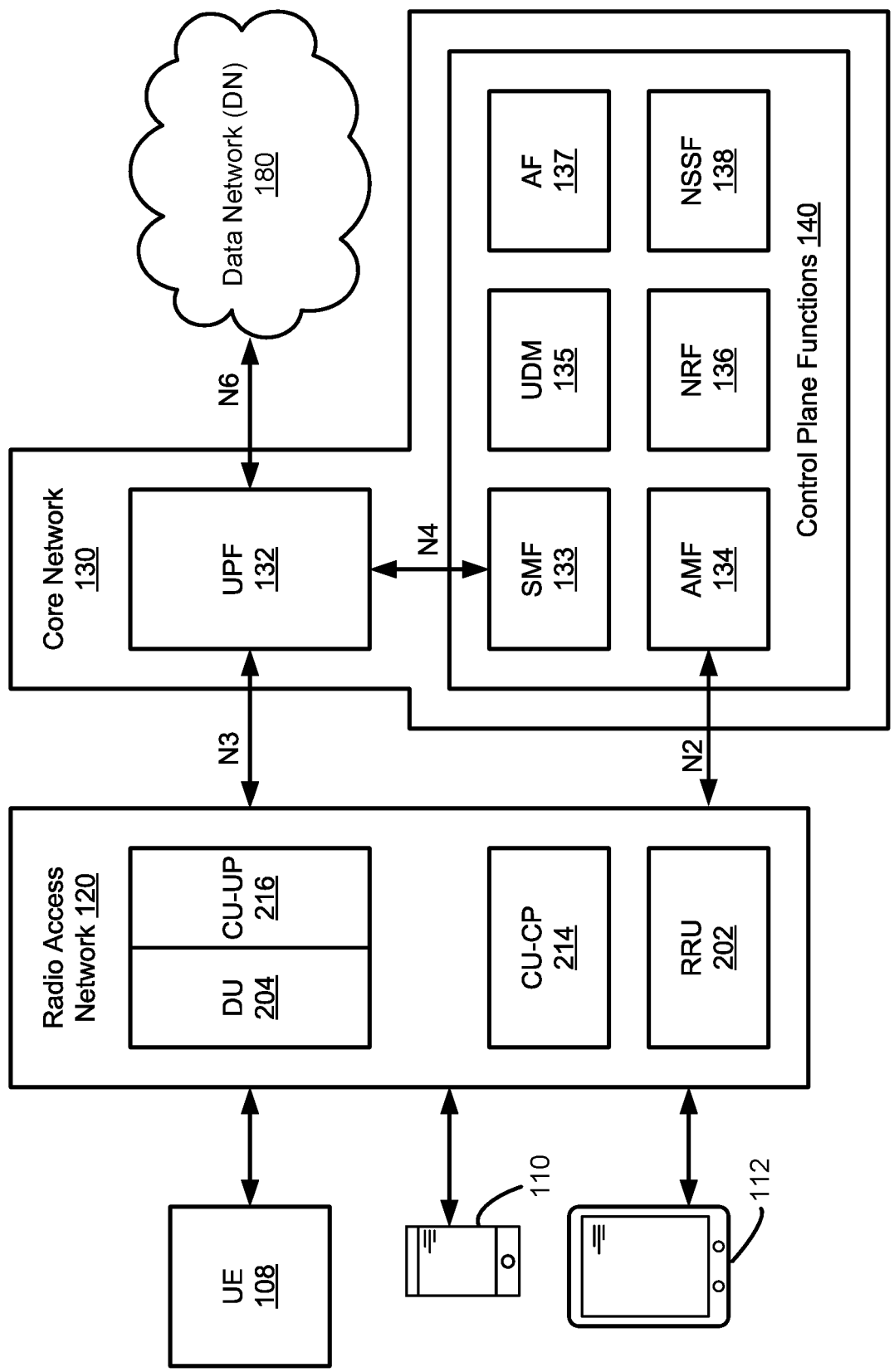

FIG. 1D depicts an embodiment of a radio access network 120 and a core network 130 for providing a communications channel (or channel) between user equipment and data network 180. The core network 130 includes UPF 132 for handling user data in the core network 130. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, UDM 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, wherein each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The unified data management function (UDM) 135 may manage user registrations and network profiles. The UDM 135 may provide access and mobility subscription data to the AMF 134 during registration and provide subscriber information to the SMF 133 during the establishment of a PDU session. The UDM 135 may be paired with a user data repository (UDR) not depicted to store user data such as subscriber information, authentication information, and encryption keys. In some cases, the UDM 135 may correspond with a cloud-native implementation of the Home Subscriber Server (HSS) in 4G wireless networks. An authentication server function (AUSF) not depicted may provide the UDM 135 with either a SUPI or an encrypted SUCI based on the subscriber information.

The radio access network 120 may provide separation of the centralized unit for the control plane (CU-CP) 216 and the centralized unit for the user plane (CU-UP) 214 functionalities while supporting network slicing. The CU-CP 216 may obtain resource utilization and latency information from the DU 204 and/or the CU-UP 216, and select a CU-UP to pair with the DU 204 based on the resource utilization and latency information in order to configure a network slice. Network slice configuration information associated with the network slice may be provided to the UE 108 for purposes of initiating communication with the UPF 132 using the network slice.

Figure 2A:
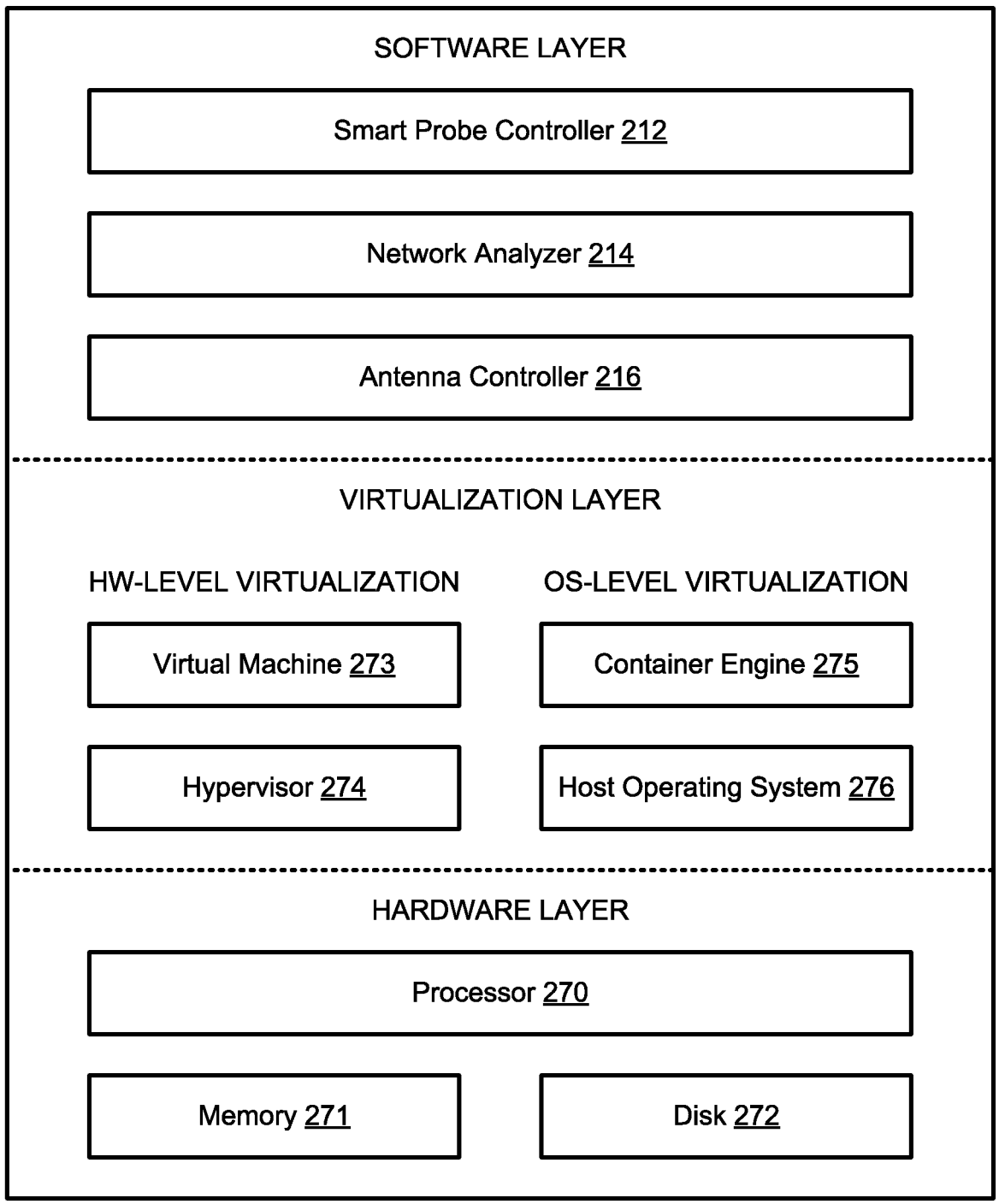
FIG. 2A depicts one embodiment of network controller.

FIG. 2A depicts one embodiment of network controller 172. As depicted, the network controller 172 includes hardware-level components and software-level components. The hardware-level components include one or more processors 270, one or more memory 271, and one or more disks 272. The software-level components include software applications, such as the smart probe controller 212, the network analyzer 214, and the antenna controller 216. The smart probe controller 212 may transfer profiles to various smart probes to configure the smart probes to mimic various wireless devices, such as a smartphone. In one embodiment, the smart probe controller 212 may detect that at least a threshold number of UEs (e.g., more than ten UEs) within an environment are utilizing a first wireless broadcast standard (or wireless transmission standard) and transfer a first profile corresponding with the first wireless broadcast standard to a set of smart probes within the environment. The first wireless broadcast standard may comprise 5G or the fifth-generation standard for broadband cellular networks.

The network analyzer 214 may aggregate wireless signal data from multiple smart probes within an environment. In one example, the network analyzer 214 may acquire wireless signal data from a first set of smart probes that were configured to mimic a first smartphone. The network analyzer 214 may detect that a first smart probe of the first set of smart probes has a signal to noise ratio that is below a threshold SNR value (e.g., is below 10 dB) and cause the antenna controller 216 to transmit instructions to one or more antennas to perform azimuth adjustment, elevation change, antenna tilt, antenna beam tilt, and/or transmit power adjustment (e.g., to increase the transmit power by 50%) to increase the signal to noise ratio for the first smart probe. The antenna controller 216 may adjust antennas used by small cells within the environment. For example, the antenna controller 216 may adjust a digital tilt and/or a transmit power for the one or more antennas of the first smart probe.

The software-level components may be run using the hardware-level components or executed using processor and storage components of the hardware-level components. For example, one or more of the software-level components may be executed or run using the processor 270, memory 271, and disk 272. In another example, one or more of the software-level components may be executed or run using a virtual processor and a virtual memory that are themselves executed or generated using the processor 270, memory 271, and disk 272.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the smart probe controller 212 and the antenna controller 216. The virtual machine 273 may run the host operation system 276 upon which the container engine 275 may run. A virtual machine, such as virtual machine 273, may include one or more virtual processors.

A container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container may comprise the unit of replication. Other computing platforms may wrap one or more containers into a pod and therefore a pod may comprise the unit of replication.

In some embodiments, a virtualized infrastructure manager not depicted may be used to provide a centralized platform for managing a virtualized infrastructure for deploying various components of the user equipment 108. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

Figure 2B:
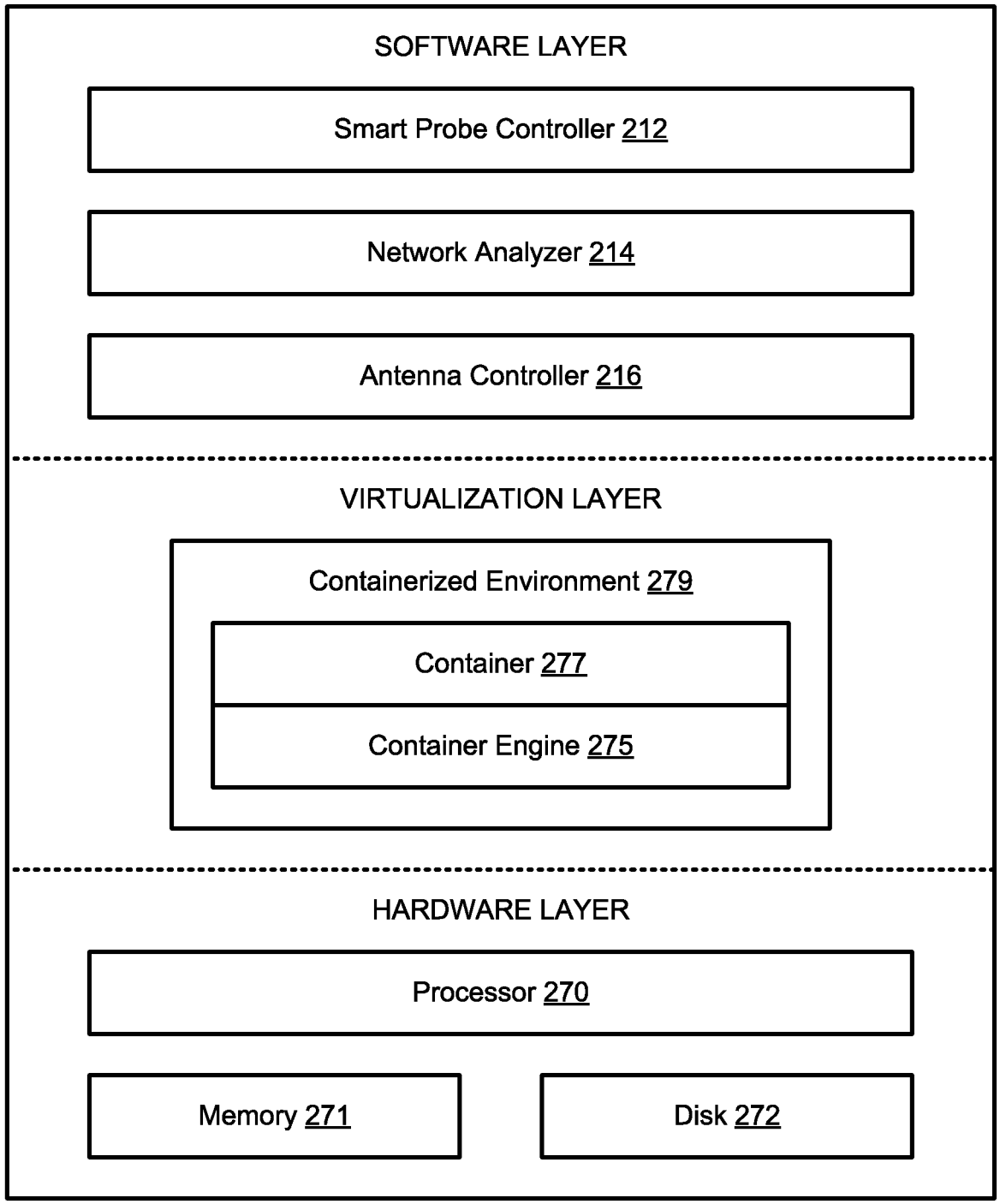
FIG. 2B depicts an embodiment of the network controller of FIG. 2A in which the virtualization layer includes a containerized environment.

FIG. 2B depicts an embodiment of the network controller 172 of FIG. 2A in which the virtualization layer includes a containerized environment 279. The containerized environment 279 includes a container engine 275 for instantiating and managing application containers, such as container 277. Containerized applications may comprise applications that run in isolated runtime environments (or containers). The containerized environment 279 may include a container orchestration service for automating the deployments of containerized applications. The container 277 may be used to deploy various microservices corresponding with processes executed by the user equipment 108. The containerized environment 279 may be executed using hardware-level components or executed using processor and storage components of the hardware-level components. In one example, the containerized environment 279 may be run using the processor 270, memory 271, and disk 272. In another example, the containerized environment 279 may be run using a virtual processor and a virtual memory that are themselves executed or generated using the processor 270, memory 271, and disk 272.

Figure 2C:
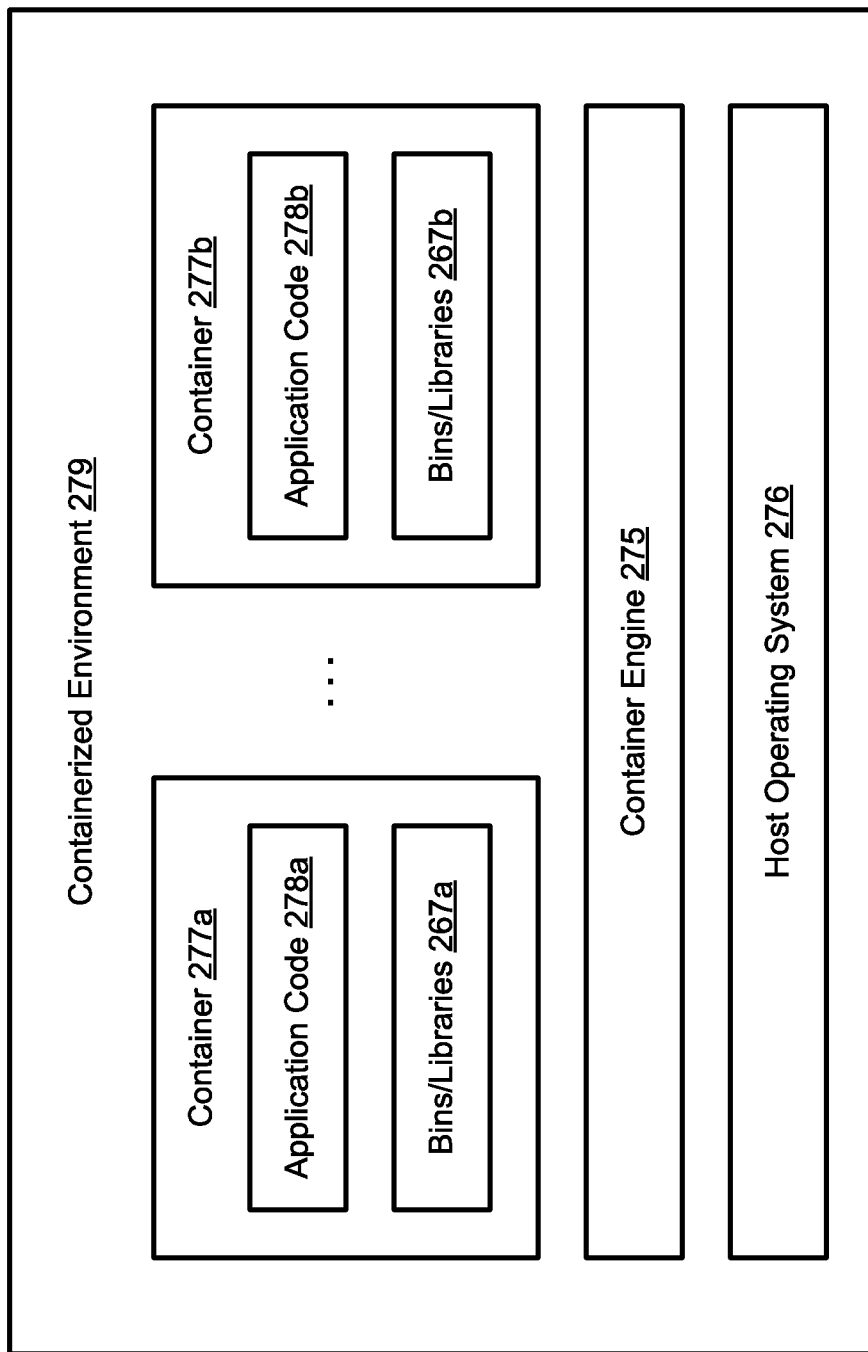
FIG. 2C depicts an embodiment of a containerized environment that includes a container engine running on top of a host operating system.

FIG. 2C depicts an embodiment of a containerized environment 279 that includes a container engine 275 running on top of a host operating system 276. The container engine 275 may manage or run containers 277a and 277b on the same operating system kernel of the host operating system 276. The container engine 275 may acquire a container image and convert the container image into one or more running processes. In some cases, the container engine 275 may group containers that make up an application into logical units (or pods). A pod may contain one or more containers and all containers in a pod may run on the same node in a cluster. Each container 277 may include application code 278 and application dependencies 267, such as operating system libraries, required to run the application code 278. As depicted, container 277a includes application code 278a and application dependencies 267a and container 277b includes application code 278b and application dependencies 267b. Containers allow portability by encapsulating an application within a single executable package of software that bundles application code 278 together with the related configuration files, binaries, libraries, and dependencies required to run the application code 278. In one embodiment, applications of the user equipment 108 may be executed using the containerized environment 279. Containerized applications may be used to isolate the containerized applications from other applications installed on the same computing device.

Figure 3A:
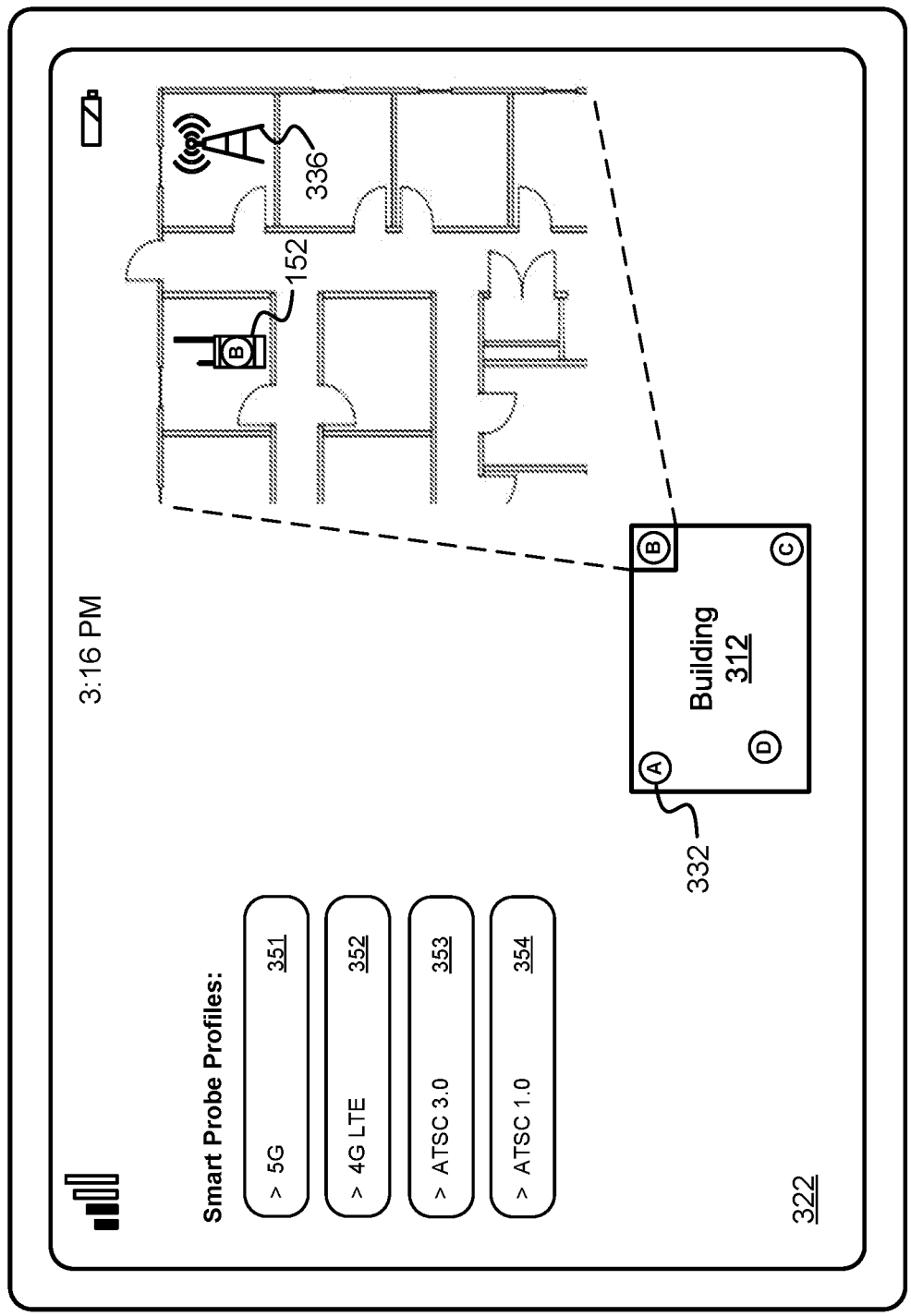
FIGS. 3A-3B depicts embodiments of user equipment.

FIG. 3A depicts one embodiment of UE 108. As depicted, the UE 108 may comprise a mobile computing device that includes a touchscreen display 322, or some other computing and display device. The touchscreen display 322 may comprise an LCD display for presenting a user interface to an end user of the UE 108. The touchscreen display 322 may include a status area that provides information regarding signal strength, time, and battery life associated with the UE 108. As depicted, a two-dimensional map of a building 312 with locations of broadcasting small cells, such as small cell 336, and smart probes, such as smart probes 152 and 332, are displayed using the touchscreen display 322. In some cases, the locations of the small cells and smart probes may correspond with GPS locations of the electronic devices. The GPS locations may be determined using a pseudolite-only system or a hybrid pseudolite-GPS system including one or more ground-based pseudo-satellite transceivers. The locations of the small cells and smart probes may also be determined using WiFi triangulation.

The small cells within the building 312 may provide a cellular or wireless network that is accessible by smartphones and other wireless devices within the building 312 or in proximity to the building 312. The smart probes within the building 312 may be configured or programmed to mimic various smartphones and wireless devices. In one example, a smart probe, such as smart probe 152, may include a software-defined radio receiver, which may be configured by loading a profile, such as profile 351, that specifies a programmable RF range (e.g., from 5 GHz to 6 GHz) as a tuning range that is monitored by the smart probe. The profile may specify one or more tuning ranges, as well as the channeling and bit rate used by the smart probe 152.

An end user of the UE 108 may specify one of the smart probe profiles 351-354 to be loaded into a selected set of smart probes. The smart probe profile 351 may correspond with wireless devices that use a 5G wireless standard and the smart probe profile 352 may correspond with wireless devices that use a 4G wireless standard.

In some embodiments, a network controller, such as the network controller 172 in FIG. 1A, may automatically configure a set of smart probes in response to detection that at least a first number of wireless devices are located within the building 312 and/or utilizing the small cells within the building 312 to access one or more wireless networks. In one example, upon detection that at least ten wireless devices have established wireless connections using a first wireless standard with the small cells within the building 312, the network controller may transmit a first profile to the set of smart probes that corresponds with wireless devices that use the first wireless standard. In some cases, the set of smart probes may comprise all of the smart probes within the building 312. In other cases, the set of smart probes may comprise a subset of the smart probes within the building 312 (e.g., only smart probes 332 and 152).

In some embodiments, the network controller may identify each wireless standard being used by wireless devices within the building 312 and transmit profiles associated with each of the wireless standards in a time multiplexed manner. For example, there may be 500 different wireless devices accessing small cells within the building 312 and utilizing three different wireless standards (e.g., 4G, 5G, and 6G wireless standards). The network controller may load one of three different profiles associated with one of the three different wireless standards into the set of smart probes every two minutes.

Figure 3B:
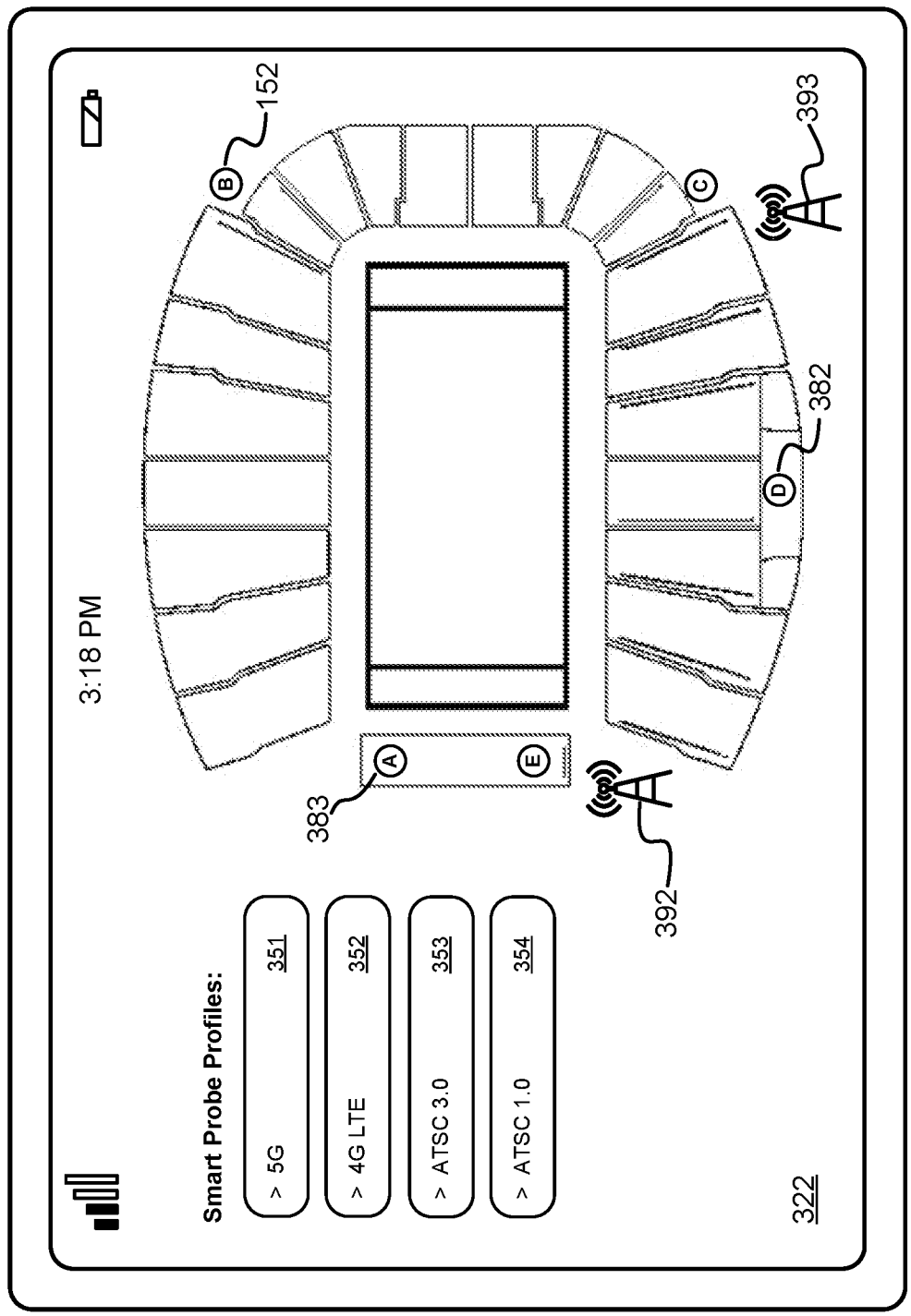

FIG. 3B depicts another embodiment of UE 108. As depicted, the UE 108 may comprise a mobile computing device that includes a touchscreen display 322. As depicted, a two-dimensional map of an outdoor venue (e.g., a stadium) with locations of small cells, such as small cells 392 and 393, and smart probes, such as smart probes 152, 382, and 383, are displayed using the touchscreen display 322. The small cells 392 and 393 may provide a cellular or wireless network that is accessible by smartphones and other wireless devices within proximity to the small cells 392 and 393. The smart probes including smart probes 152, 382, and 383 may be configured or programmed to imitate various smartphones and wireless devices at the outdoor venue. In one example, a smart probe, such as smart probe 152, may include a software-defined radio receiver, which may be configured by loading a profile, such as profile 351, that specifies a tuning range for the smart probe. The profile may also specify one or more other parameters such as the channeling and bit rate used by the smart probe 152.

In some embodiments, a network controller, such as network controller 172 in FIG. 1A, may determine a first set of wireless devices communicating with the small cell 392 using a first wireless standard and determine a second set of wireless devices communicating with the small cell 393 using a second wireless standard different from the first wireless standard. The network controller may cause the smart probes 152, 382, and 383 to be configured to analyze wireless signals associated with the first wireless standard during a first time period and cause the smart probes 152, 382, and 383 to be configured to analyze wireless signals associated with the second wireless standard during a second time period subsequent to the first time period. In one example, the network controller may transmit a profile 351 to the smart probes 152, 382, and 383 for use during the first time period and transmit a profile 352 to the smart probes 152, 382, and 383 for use during the second time period.

Figure 4A:
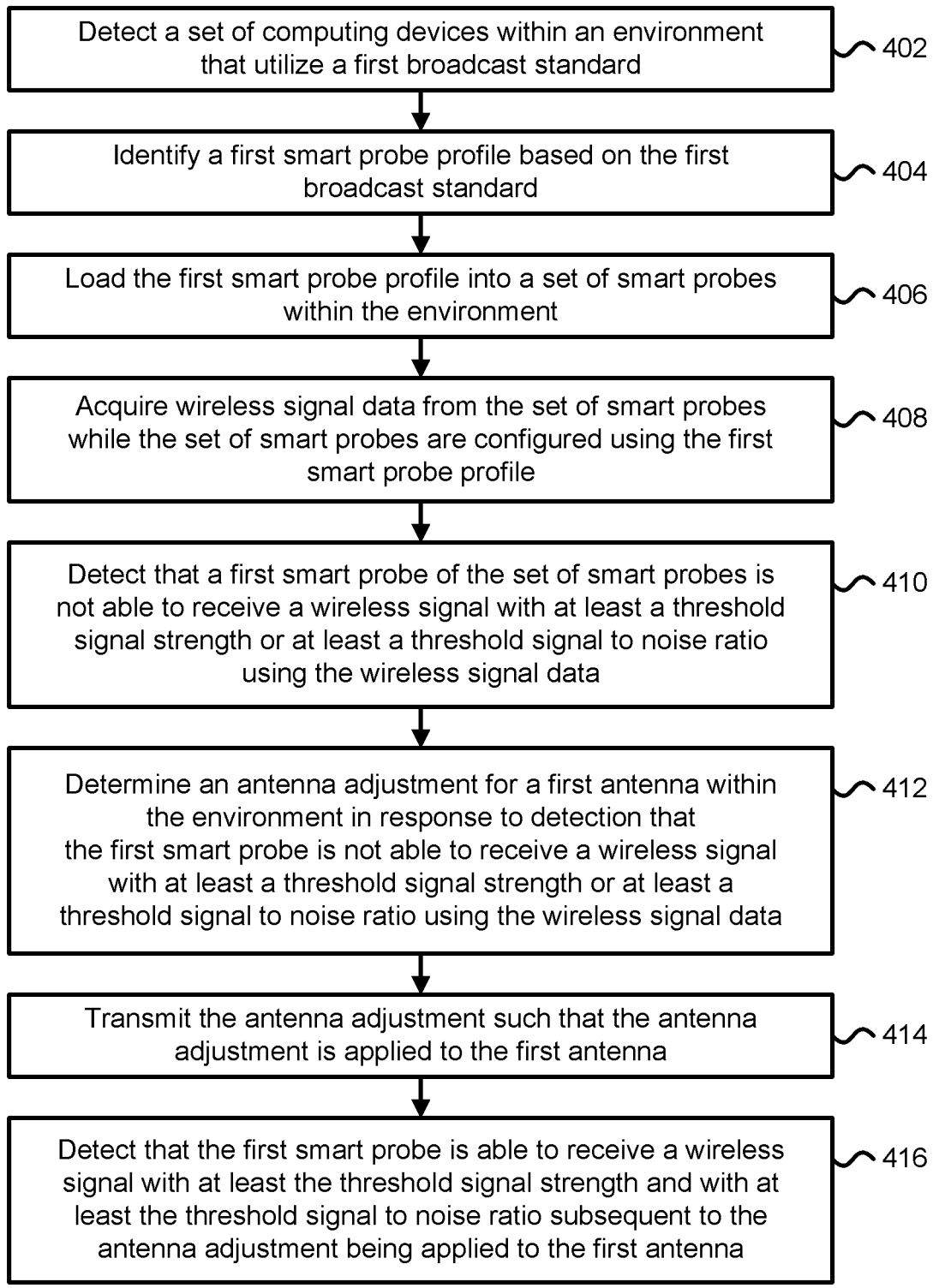
FIG. 4A depicts a flowchart describing an embodiment of a process for tracking wireless signal data for one or more wireless networks and adjusting antenna parameters associated with the one or more wireless networks.

FIG. 4A depicts a flowchart describing an embodiment of a process for tracking wireless signal data for one or more wireless networks and adjusting antenna parameters associated with the one or more wireless networks. In one embodiment, the process of FIG. 4A may be performed using one or more real or virtual machines and/or one or more containerized applications. In another embodiment, the process of FIG. 4A or portions thereof may be performed using a containerized environment, such as the containerized environment 279 in FIG. 2C. In another embodiment, the process of FIG. 4A or portions thereof may be performed using a smart probe, such as smart probe 152 in FIG. 1A, and a network controller, such as network controller 172 in FIG. 1A.

In step 402, a set of computing devices within an environment that utilize a first broadcast standard is detected. The first broadcast standard may comprise a wireless transmission standard. The set of computing devices may comprise wireless computing devices, such as a smartphone. The environment may correspond with a building, such as building 312 in FIG. 3A. In step 404, a first smart probe profile is identified based on the first broadcast standard. In one example, the first broadcast standard may correspond with a 5G wireless standard and the first smart probe profile may specify one or more tuning ranges corresponding with the 5G wireless standard. In step 406, the first smart probe profile is loaded into a set of smart probes within the environment. In one example, a network controller, such as the network controller 172 in FIG. 1A, may wirelessly transfer the first smart probe profile to each of the set of smart probes. The first smart probe profile may be loaded into a smart probe, such as smart probe 152, by storing the first smart probe profile in a memory, such as memory 157 in FIG. 1A, and executing instructions associated with the first smart probe profile using a processor, such as processor 156 in FIG. 1A.

In step 408, wireless signal data is acquired from the set of smart probes while the set of smart probes are configured using the first smart probe profile. The first smart probe profile may specify one or more tuning ranges and one or more channels to be used by the set of smart probes. In step 410, it is detected that a first smart probe of the set of smart probes is not able to receive a wireless signal with at least a threshold signal strength or at least a threshold signal-to-noise ratio using the wireless signal data. In one example, it may be detected that a power level of a wireless signal received at the first smart probe is less than −110 dBm. In another example, it may be detected that a signal-to-noise ratio for a wireless signal received by the first smart probe is less than 15 dB.

In step 412, an antenna adjustment for a first antenna within the environment is determined in response to detection that the first smart probe is not able to receive the wireless signal with at least the threshold signal strength or at least the threshold signal-to-noise ratio using the wireless signal data. The antenna adjustment may comprise an azimuth adjustment, elevation change, antenna tilt, digital tilt, antenna beam tilt, and/or increase in transmit power. The first antenna may correspond with a small cell, such as the small cell 336 in FIG. 3A. In step 414, the antenna adjustment is transmitted such that the antenna adjustment is applied to the first antenna. In one example, a network controller, such as the network controller 172 in FIG. 1A, may transmit the antenna adjustment to a small cell, such as the small cell 336 in FIG. 3A. The antenna adjustment may cause a change in the digital tilt, antenna beam tilt, and/or transmit power for an antenna of the small cell 336 in FIG. 3A. In step 416, it is detected that the first smart probe is able to receive a wireless signal with at least the threshold signal strength and with at least the threshold signal-to-noise ratio subsequent to the antenna adjustment being applied to the first antenna.

Figure 4B:
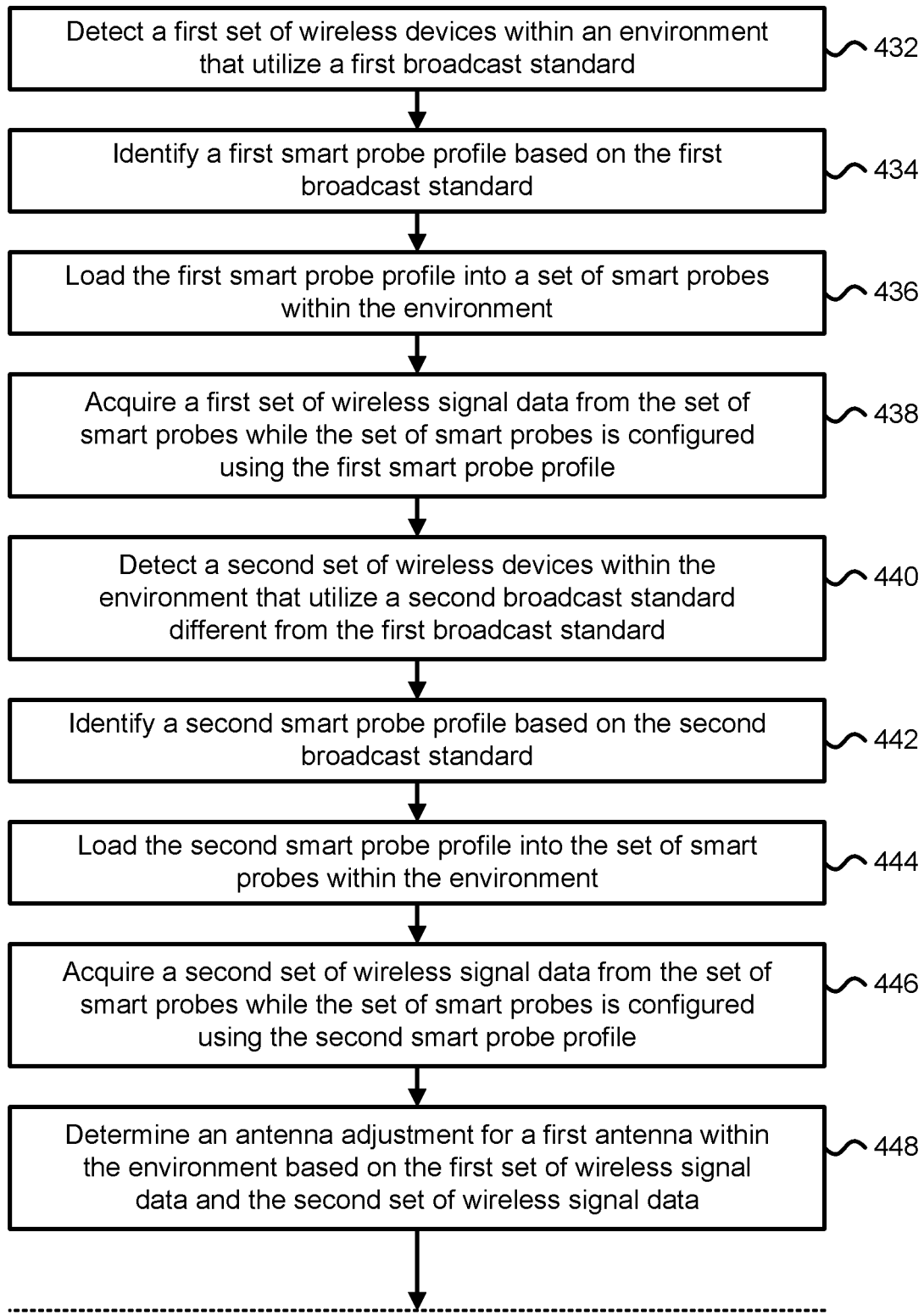
FIGS. 4B-4C depict a flowchart describing another embodiment of a process for tracking wireless signal data for one or more wireless networks and adjusting antenna parameters associated with the one or more wireless networks.
Figure 4C:
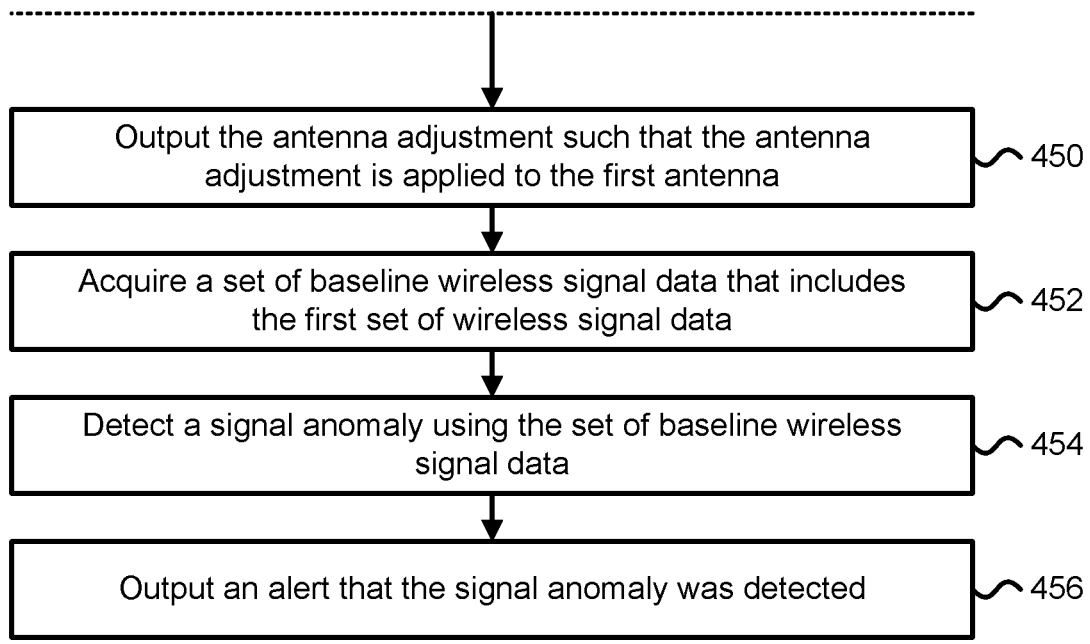

FIGS. 4B-4C depict a flowchart describing another embodiment of a process for tracking wireless signal data for one or more wireless networks and adjusting antenna parameters associated with the one or more wireless networks. In one embodiment, the process of FIGS. 4B-4C may be performed using one or more real or virtual machines and/or one or more containerized applications. In another embodiment, the process of FIGS. 4B-4C or portions thereof may be performed using a containerized environment, such as the containerized environment 279 in FIG. 2C. In another embodiment, the process of FIGS. 4B-4C or portions thereof may be performed using a smart probe, such as smart probe 152 in FIG. 1A, and a network controller, such as network controller 172 in FIG. 1A.

In step 432 in FIG. 4B, it is detected that a first set of wireless devices utilize a first broadcast standard within an environment. The first set of wireless devices may include UE 108 in FIG. 1A. The first broadcast standard may correspond with a 5G wireless standard. In step 434, a first smart probe profile is identified based on the first broadcast standard. In some cases, a lookup table may map the first broadcast standard to a corresponding first smart probe profile to be used by one or more smart probes to mimic wireless devices that utilize the first broadcast standard. In step 436, the first smart probe profile is loaded into a set of smart probes within the environment. In one example, the set of smart probes may include smart probe 152 in FIG. 3A and the first smart probe profile may specify a tuning range for the smart probe 152 in FIG. 3A.

In step 438, a first set of wireless signal data is acquired from the set of smart probes while the set of smart probes is configured using the first smart probe profile. The wireless signal data may include signal strength and noise metrics at different locations associated with the set of smart probes within the environment. The wireless signal data may include a received signal level in decibels per milliwatt (dBm) at a particular location within the environment associated with one of the set of smart probes and a signal-to-noise ratio (SNR) in decibels (dB) at the particular location within the environment.

In step 440, it is detected that a second set of wireless devices utilize a second broadcast standard different from the first broadcast standard within the environment. The second set of wireless devices may include UE 108 in FIG. 1A. The second broadcast standard may correspond with a 4G wireless standard. In step 442, a second smart probe profile is identified based on the second broadcast standard. In some cases, a lookup table stored within a network controller, such as the network controller 172 in FIG. 1A, may be used to identify the second smart probe profile based on the second broadcast standard.

In step 444, the second smart probe profile is loaded into the set of smart probes within the environment. In some embodiments, a network controller may identify each wireless standard being used by wireless devices transmitting wireless signals that may be received by the set of smart probes and the network controller may cause the set of smart probes to time multiplex different profiles corresponding with each of the wireless standards used by the wireless devices. In one example, the network controller may transmit the different profiles corresponding with each of the wireless standards to the set of smart probes and the set of smart probes may configure themselves every ten minutes to use one of the different profiles.

In step 446, a second set of wireless signal data is acquired from the set of smart probes while the set of smart probes is configured using the second smart probe profile. In one embodiment, a network controller may transmit the first smart probe profile to the set of smart probes prior to acquiring the first set of wireless signal data and may transmit the second smart probe profile to the set of smart probes prior to acquiring the second set of wireless signal data.

In step 448, an antenna adjustment for a first antenna within the environment is determined based on the first set of wireless signal data and/or the second set of wireless signal data.

In step 450 in FIG. 4C, the antenna adjustment is outputted such that the antenna adjustment is applied to the first antenna. In some embodiments, the first antenna may correspond with a small cell within the environment and the antenna adjustment may be determined by a network controller and then transmitted from the network controller to the small cell.

In step 452, a set of baseline wireless signal data that includes the first set of wireless signal data is acquired. In step 454, a signal anomaly is detected using the set of baseline wireless signal data. In step 456, an alert that the signal anomaly was detected is outputted. In one embodiment, the detection of the signal anomaly may comprise detection of a new wireless network within the environment.

At least one embodiment of the disclosed technology includes one or more processors configured to detect that a first set of wireless devices utilize a first broadcast standard, identify a first smart probe profile based on the first broadcast standard, acquire a first set of wireless signal data from a set of smart probes while the set of smart probes is configured using the first smart probe profile, detect that a first smart probe of the set of smart probes is not able to receive a wireless signal with at least a threshold signal strength based on the first set of wireless signal data, determine an antenna adjustment for a first antenna that transmitted the wireless signal in response to detection that the first smart probe is not able to receive the wireless signal with at least the threshold signal strength, and output the antenna adjustment such that the antenna adjustment is applied to the first antenna.

In some cases, the set of smart probes may include a software-defined radio receiver that is configured based on the first smart probe profile. In some cases, the one or more processors may be configured to identify each wireless standard used by wireless devices transmitting wireless signals received by the set of smart probes and cause the set of smart probes to time multiplex different profiles corresponding with each of the wireless standards used by the wireless devices.

At least one embodiment of the disclosed technology includes detecting that a first set of wireless devices utilize a first broadcast standard to communicate with one or more small cells, identifying a first smart probe profile based on the first broadcast standard, acquiring a first set of wireless signal data from a set of smart probes while the set of smart probes is configured using the first smart probe profile, detecting that a first smart probe of the set of smart probes received a wireless signal that does not satisfy a signal requirement based on the first set of wireless signal data, determining an antenna adjustment for a first antenna of the one or more small cells that transmitted the wireless signal in response to detection that the first smart probe received the wireless signal that does not satisfy the signal requirement, and transmitting the antenna adjustment to the one or more small cells.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining that at least one wireless device utilizes a selected broadcast standard within a selected environment to communicate with one or more wireless network cells;
   selecting a smart probe profile based on the broadcast standard;
   acquiring wireless signal data obtained by a smart probe that is independent of the at least one wireless device and is within the selected environment from the one or more one wireless network cells, the wireless signal data describing wireless signals that were transmitted using the selected broadcast standard and received by the smart probe, wherein the smart probe is a radio frequency probe that is configured to capture radio frequency signals within a programmable radio frequency range using the smart probe profile;
   detecting that the smart probe received a wireless signal that was transmitted using the selected broadcast standard and that fails to satisfy a signal requirement based on the wireless signal data;
   selecting a transmission adjustment for at least one selected wireless network cells of the one or more wireless network cells in response to detection that the smart probe received the wireless signal that fails to satisfy the signal requirement; and
   providing the transmission adjustment to the at least one selected wireless network cell.

2. The method of claim 1, wherein:
   the smart probe is a software-defined radio receiver that is configured using the smart probe profile.

3. The method of claim 1, wherein:
   the detecting that the smart probe received the wireless signal that fails to satisfy the signal requirement includes detecting that the smart probe was not able to receive the wireless signal with at least a threshold signal strength based on the wireless signal data.

4. The method of claim 1, further comprising:
   identifying each wireless broadcast standard used by wireless devices connected to the one or more wireless network cells; and
   causing a set of profiles associated with each of the wireless broadcast standards to be time multiplexed by the smart probe.

5. The method of claim 1, further comprising:
   identifying each wireless standard used by wireless devices transmitting wireless signals received by the smart probe; and
   causing the smart probe to time multiplex different profiles corresponding to each of the wireless standards used by the wireless devices.

6. The method of claim 1, wherein:
   the transmission adjustment comprises an adjustment to an antenna beam tilt for an antenna of the at least one selected wireless network cell.

7. A wireless network controller, comprising:
   one or more processors configured to:
      detect that at least a first number of wireless devices utilize a first broadcast standard to communicate with one or more small cells;
      identify a first smart probe profile based on the first broadcast standard in response to detection that at least the first number of wireless devices utilize the first broadcast standard to communicate with the one or more small cells;
      acquire a first set of wireless signal data from a set of smart probes that are independent of the first number of wireless devices, the first set of wireless signal data describing wireless signals that were transmitted using the first broadcast standard and received by the set of smart probes, wherein each smart probe of the set of smart probes is a radio frequency probe that is configured to capture radio frequency signals within a programmable radio frequency range using the first smart probe profile;
      detect that a first smart probe of the set of smart probes is not able to receive a wireless signal that was transmitted using the first broadcast standard with at least a threshold signal-to-noise ratio based on the first set of wireless signal data;
      determine an antenna adjustment for a first antenna of the one or more small cells that transmitted the wireless signal in response to detection that the first smart probe is not able to receive the wireless signal with at least the threshold signal-to-noise ratio; and
      transmit the antenna adjustment to the one or more small cells.

8. A system, comprising:
   one or more processors configured to:
      detect that a first set of wireless devices utilize a first broadcast standard;
      identify a first smart probe profile based on the first broadcast standard;
      acquire a first set of wireless signal data from a set of smart probes that are independent of the first set of wireless devices, the first set of wireless signal data describing wireless signals that were transmitted using the first broadcast standard and received by the set of smart probes, wherein each smart probe of the set of smart probes is a radio frequency probe that is configured to capture radio frequency signals within a programmable radio frequency range using the first smart probe profile;

detect that a first smart probe of the set of smart probes is not able to receive a wireless signal that was transmitted using the first broadcast standard with at least a threshold signal strength based on the first set of wireless signal data;

determine an antenna adjustment for a first antenna that transmitted the wireless signal in response to detection that the first smart probe is not able to receive the wireless signal with at least the threshold signal strength; and output the antenna adjustment such that the antenna adjustment is applied to the first antenna.

9. The system of claim 8, wherein:
the set of smart probes includes a software-defined radio receiver that is configured based on the first smart probe profile.

10. The system of claim 8, wherein:
the first set of wireless signal data corresponds with one or more wireless transmissions for a wireless network; and
the one or more processors are configured to identify each wireless broadcast standard used by wireless devices connected to the wireless network and cause a set of profiles associated with each of the wireless broadcast standards to be time multiplexed by the set of smart probes.

11. The system of claim 8, wherein:
the one or more processors are configured to identify each wireless standard used by wireless devices transmitting wireless signals received by the set of smart probes and cause the set of smart probes to time multiplex different profiles corresponding with each of the wireless standards used by the wireless devices.

12. The system of claim 8, wherein:
the one or more processors are configured to transmit the antenna adjustment to a small cell that includes the first antenna.

13. The system of claim 8, wherein:
the antenna adjustment comprises an increase in a transmission power for the first antenna.

14. The system of claim 8, wherein:
the antenna adjustment comprises an adjustment to an antenna beam tilt for the first antenna.

15. The system of claim 8, wherein:
the antenna adjustment comprises an adjustment to a digital tilt for the first antenna.

16. The system of claim 8, wherein:
the one or more processors are configured to detect that the first smart probe is not able to receive the wireless signal with at least a threshold signal-to-noise ratio based on the first set of wireless signal data and determine the antenna adjustment for the first antenna in response to detection that the first smart probe is not able to receive the wireless signal with at least the threshold signal-to-noise ratio.

17. The system of claim 8, wherein:
the one or more processors are configured to load the first smart probe profile into the set of smart probes prior to acquisition of the first set of wireless signal data.

18. The system of claim 8, wherein:
the one or more processors are configured to detect that a second set of wireless devices utilize a second broadcast standard different from the first broadcast standard and identify a second smart probe profile based on the second broadcast standard, the one or more processors are configured to load the second smart probe profile into the set of smart probes and acquire a second set of wireless signal data from the set of smart probes while the set of smart probes is configured using the second smart probe profile.

19. The system of claim 8, wherein:
the one or more processors are configured to detect that the first set of wireless devices includes at least a threshold number of wireless devices and identify the first smart probe profile in response to detection that the first set of wireless devices includes at least the threshold number of wireless devices.

20. The system of claim 8, wherein:
the first set of wireless signal data corresponds with one or more wireless transmissions for a wireless network; and
the one or more processors are configured to detect that a service level agreement requirement for the wireless network is not satisfied based on the first set of wireless signal data.

* * * * *